Aug. 6, 1940.    J. H. WILLIAMS    2,210,826
FLUID PACKING
Filed April 19, 1939    2 Sheets-Sheet 1

James H. Williams
INVENTOR.
BY
his ATTORNEY.

Aug. 6, 1940.  J. H. WILLIAMS  2,210,826
FLUID PACKING
Filed April 19, 1939   2 Sheets-Sheet 2
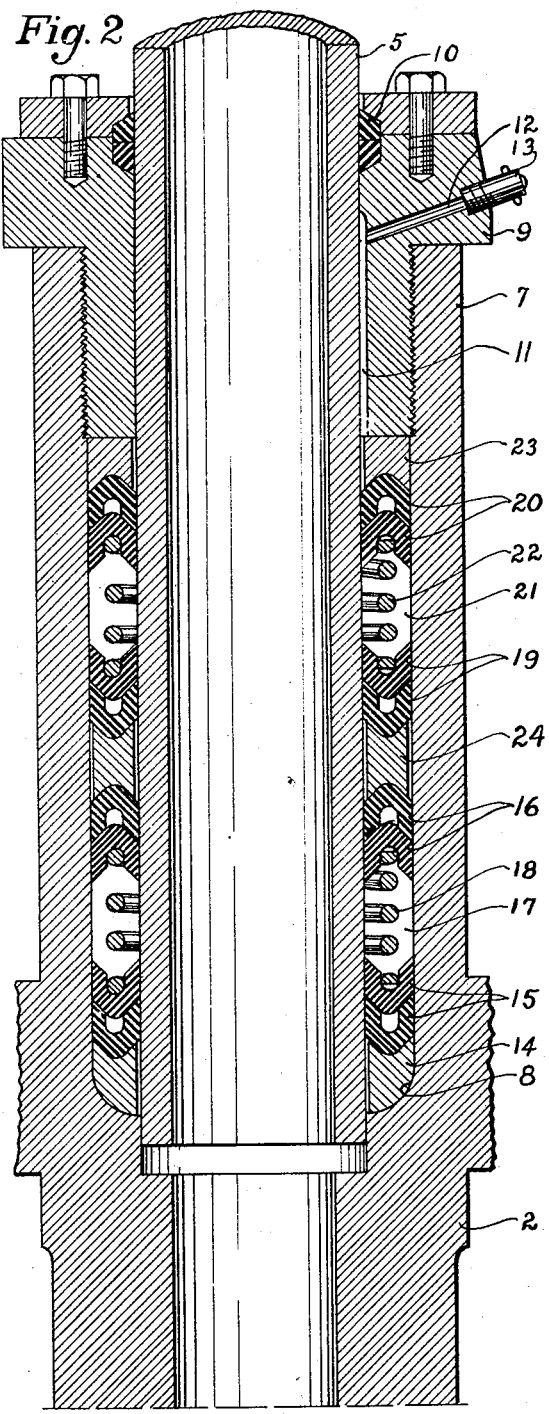
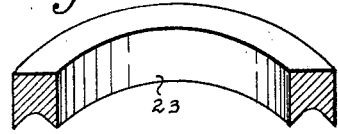
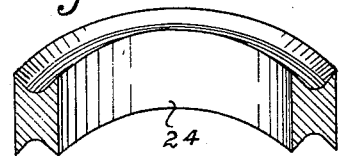
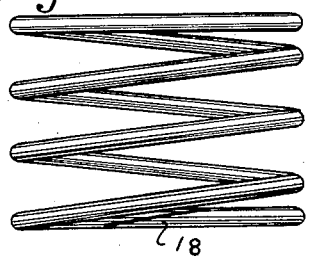
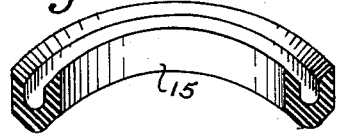
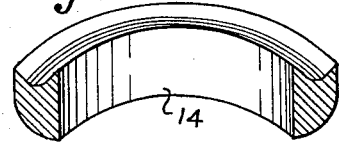
James H. Williams
INVENTOR.
BY *J. Preston Swecker*
  his ATTORNEY.

Patented Aug. 6, 1940

2,210,826

UNITED STATES PATENT OFFICE 2,210,826

FLUID PACKING

James H. Williams, Wichita Falls, Tex.

Application April 19, 1939, Serial No. 268,835

3 Claims. (Cl. 285—97.1)

This invention relates to an improvement in fluid packings, and more particularly to a packing adapted to hold a fluid under extremely high pressure.

The object of the invention is to improve the construction and effectiveness of packings of this character by creating a counteracting pressure in a packing chamber sufficient to prevent the entry of fluid under extremely high pressure into said chamber. This invention is particularly adaptable to the packing of swiveled joints, such as are used on rotary drilling rigs of oil wells, in which very high pressures are employed and it is necessary to pack such swivels against leakage, and yet to lubricate the same so as to permit of relative turning movement between the parts.

In carrying out the object of this invention, separate packing chambers are provided in the swivel with a movable packing therebetween acted on in opposite directions by opposing springs. A leakage of fluid to the packing means of one of said chambers will be communicated through the movement of said movable packing to the spring of the other chamber which will create a counter-acting force to equalize or oppose the first-mentioned pressure, thus allowing for movement of the packing members in response to the force exerted thereon while maintaining a substantial packing pressure sufficient to prevent the leakage of the fluid.

I have illustrated a preferred embodiment of this invention in the accompanying drawings, in which:

Fig. 2 is an enlarged vertical sectional view through the pipe and fluid packing of said swivel;

Fig. 3 is a perspective cross section of the top follower ring;

Fig. 4 is a similar view of a movable follower ring;

Fig. 5 is a side elevation of a coiled spring adapted to be interposed between the packing rings;

Fig. 6 is a perspective cross section of a packing ring; and

Fig. 7 is a similar view of the lower supporting ring of the packing at the bottom of the gland.

Figure 1:
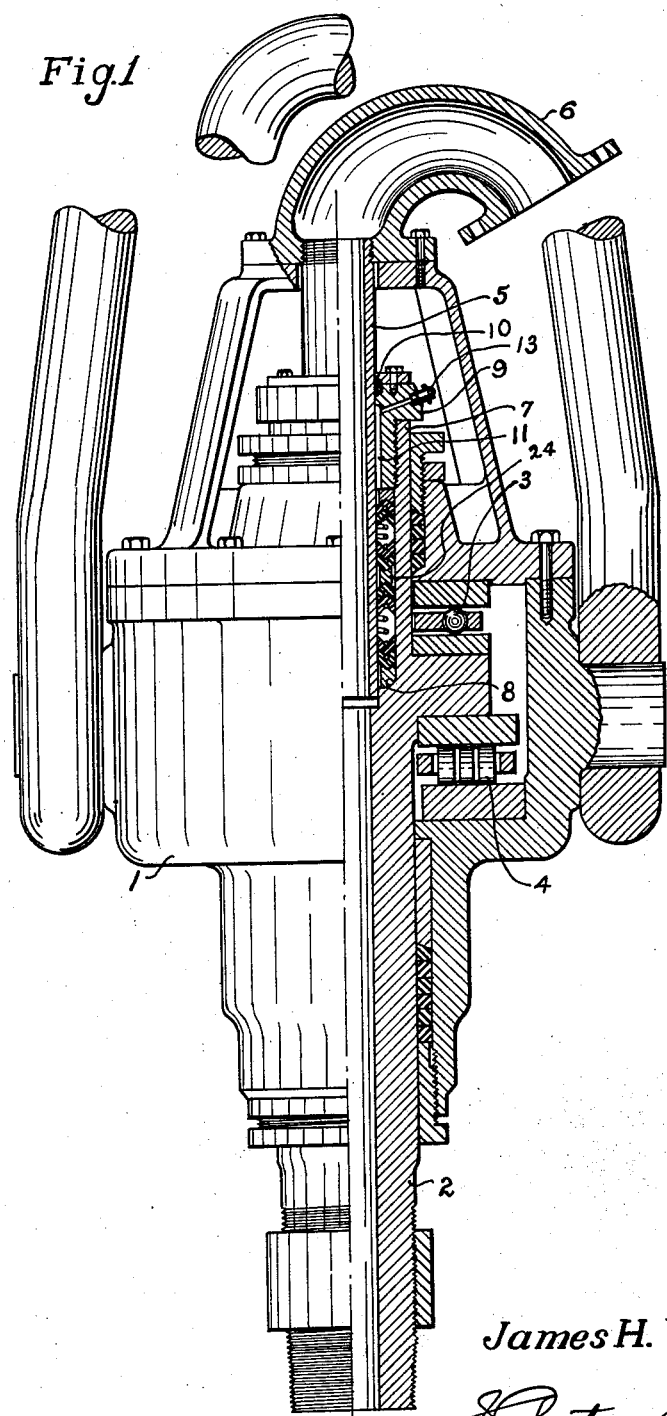
Fig. 1 is a quarter sectional view through a swivel of a rotary drilling rig, showing the application of my improved fluid packing thereto.

The invention is shown in Fig. 1 as applied to a conventional swivel which is designated generally by the numeral 1, having a rotatable stem 2 therein arranged for rotation on bearings 3 and 4 in the swivel. A stationary or non-rotatable pipe 5 extends into the upper portion of the swivel, in telescopic relation with the stem 2, to conduct the discharge fluid from the stem 2 outward through a gooseneck 6 to a suitable point for discharge. The fluid pressure utilized in rotary drilling is extremely high, and it is necessary therefore to provide a secure packing gland between the rotatable stem 2 and the non-rotatable discharge pipe 5, so as to prevent the leakage of this extremely high pressure therebetween.

This packing gland is shown more clearly in Fig. 2 as having a housing in which a sleeve 7 extends upwardly from the upper end of the stem 2 surrounding the lower end portion of the connecting pipe 5, which sleeve 7 has an annular recess 8 therein between the same and the periphery of the pipe, adapted to receive the packing means. The upper end of the recess 8 is closed by a collar 9 having internal screw-threaded connection with the sleeve 7, and preferably having a packing 10 within said collar between the same and the periphery of the pipe 5 to prevent the leakage of lubricant therebetween. The collar 9 has a groove 11 extending upwardly in the inner surface thereof to a radial orifice 12 provided with a lubricant fitting 13 at the outer end thereof, through which lubricant may be forced downward in the orifice 12 and groove 11 and through the lower end of said groove into the recess 8 where the packing is located, substantially to fill said recess with lubricant around the packing material.

Mounted at the lower end of the recess 8 is a bottom supporting ring 14. Seated upon the supporting ring 14 are packing rings 15, of which one or more may be used, while similar packing rings 16 are spaced thereabove and inverted relative thereto providing a chamber 17 between said packing rings 15 and 16. A coiled spring 18 is interposed between the packing rings 15 and 16 and bears in opposite directions thereagainst tending to push the respective packing members apart.

Similar sets of packing rings 19 and 20 are disposed in the upper portion of the recess 8 having a packing chamber 21 therebetween with a coiled spring 22 normally tending to hold the rings 19 and 20 apart and pressing the same in opposite directions. A follower ring 23 is interposed between the packing rings 20 and the lower end of the collar 9. Interposed between the packing rings 16 and 19 is a movable follower ring 24, which tends to hold the same separated and in proper positions in the packing gland and allowing movement thereof in response to the pressures exerted on these rings.

It will be apparent that packing gland structure is provided with four separate and independent sets of packing members with two separate chambers therebetween. When these parts are assembled in the recess 8, these chambers 17 and 21 are successively and completely filled with lubricant. Then after assembly, additional lubricant is forced in through the fitting 13 and passage 11, down past the packing rings 20 to increase the amount of lubricant in the chamber 21, tending to force the movable follower ring 24 downward, which will have a tendency to force the packing rings 16 downward and increase the pressure in the chamber 17. Any fluid which leaks between the pipe 5 and the stem 2 into the packing gland will find its way into the chamber 17 and there act on the packing rings 16, tending to force the same upward against the tension of the spring 22. Since the packing chambers 17 and 21 are filled with lubricant, very little, if any, fluid will enter the chamber 17, but if it does enter such chamber and act on the packing rings 16, these rings together with the packing chamber 21 and rings 20 will effectively prevent the further leakage of the fluid pressure between these parts of the swivel. The shifting of the movable follower 24 in response to the pressure created in the chamber 17 by the leakage of pressure thereto will create an increased pressure in chamber 21 sufficient to effectively counter-balance the same and oppose the pressure thereof.

The packing rings are shown as formed preferably of annular rings, approximately V-shaped in cross section and are preferably formed of rubber or other non-metallic yieldable material, which have a tendency to spread under pressure and closely hug the walls of the respective chambers. This causes the opposed sets of packing rings to prevent the escape of lubricant from the packing chambers 17 and 21. The follower rings are preferably metallic.

I claim:

1. A packing gland comprising a member having a recess therein and a means for closing one end of said recess, packing rings at the opposite end of the recess and at the inner end of the collar, spaced packing rings in the recess intermediate the ends thereof and having a movable follower ring interposed therebetween, the last-mentioned packing rings coacting with the first-mentioned packing rings to provide separated lubricant chambers in the recess, and resilient means in the respective chambers acting in opposite directions against the packing rings.

2. A packing gland comprising telescoped members having a recess therebetween and a collar at one end of said recess, packing rings at the opposite end of the recess and at the inner end of the collar, spaced packing rings in the recess intermediate the ends thereof and having a movable follower ring interposed therebetween, said spaced packing rings being approximately V-shaped in cross section and said packing rings on opposite sides of the follower ring being turned in opposite directions, the last-mentioned packing rings coacting with the first-mentioned packing rings to provide separated lubricant chambers in the recess, coiled springs in the respective chambers acting in opposite directions against the packing rings, and means for directing lubricant through the collar into one of said packing chambers for forcing the movable packing rings and follower toward the opposite chamber.

3. A packing gland comprising a housing having a shoulder at one end thereof and means for closing the housing at the opposite end thereof, packing means at the opposite ends of the housing, packing rings in the housing intermediate said packing means with movable follower means interposed therebetween, said packing rings coacting with the packing means to provide separated lubricant chambers in the housing, and said packing rings being constructed for sealing the chambers from each other, whereby pressure applied in one of said chambers will move the packing rings and follower means to increase the pressure in the other chamber.

JAMES H. WILLIAMS.